United States Patent
Lean et al.

(10) Patent No.: US 8,875,903 B2
(45) Date of Patent: Nov. 4, 2014

(54) VORTEX STRUCTURE FOR HIGH THROUGHPUT CONTINUOUS FLOW SEPARATION

(75) Inventors: Meng H. Lean, Santa Clara, CA (US); Jeonggi Seo, Albany, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 662 days.

(21) Appl. No.: 11/725,358

(22) Filed: Mar. 19, 2007

(65) Prior Publication Data

US 2008/0230458 A1    Sep. 25, 2008

(51) Int. Cl.
| | |
|---|---|
| B04C 5/14 | (2006.01) |
| B01D 21/26 | (2006.01) |
| B04C 5/26 | (2006.01) |
| B01D 45/12 | (2006.01) |
| B03B 5/32 | (2006.01) |
| B04C 1/00 | (2006.01) |

(52) U.S. Cl.
CPC ............ *B01D 45/12* (2013.01); *B01D 2221/10* (2013.01); *B01D 21/265* (2013.01); *B04C 5/26* (2013.01); *B03B 5/32* (2013.01); *B04C 1/00* (2013.01)
USPC ............................ 209/728; 209/712; 209/725

(58) Field of Classification Search
CPC .............. B04C 5/12; B04C 5/14; B04C 5/15; B04C 5/24; B04C 5/26; B04C 2009/005; B04C 5/08; B04C 5/10
USPC ................. 209/208, 724, 725, 728, 712, 719, 209/729–732, 727
See application file for complete search history.

(56) References Cited

U.S. PATENT DOCUMENTS

| | | | | |
|---|---|---|---|---|
| 1,675,941 | A | * | 7/1928 | Lycurgus ................... 241/48 |
| 2,965,522 | A | * | 12/1960 | Crespin et al. ............ 134/25.1 |
| 3,352,745 | A | * | 11/1967 | Malm ......................... 162/55 |
| 3,486,619 | A | * | 12/1969 | Ahlborg et al. ............ 209/729 |
| 3,947,364 | A | | 3/1976 | Laval |
| 4,011,068 | A | | 3/1977 | Llewelyn et al. |
| 4,140,632 | A | | 2/1979 | Boivin |
| 4,146,468 | A | | 3/1979 | Wilson |

(Continued)

FOREIGN PATENT DOCUMENTS

| | | |
|---|---|---|
| EP | 0 570 757 A1 | 11/1993 |
| FR | 1 253 230 A | 2/1961 |

(Continued)

OTHER PUBLICATIONS

Chiu et al., "High Radial Acceleration in MicroVortices," Nature, vol. 425, Sep. 4, 2003.

(Continued)

*Primary Examiner* — Joseph C Rodriguez
(74) *Attorney, Agent, or Firm* — Fay Sharpe LLP (57) ABSTRACT

A system to facilitate separation and concentration of particles based on centrifugal force on suspended particles, including biological matter, which are made to flow in a vortex structure is provided. The centrifugal force urges larger particles to collect along outer portions of the vortex flow. Conversely, within a vortex structure, a radial hydrodynamic pressure drop is also amplified to urge smaller particles toward inner portions of the vortex flow. This force created by the pressure can reach magnitudes that encourage a sharp cut-off and improved resolution discrimination between particle sizes. Thus, separated streams of particles can be collected with both increased concentration and purification.

20 Claims, 8 Drawing Sheets

(56) References Cited

U.S. PATENT DOCUMENTS

| | | | |
|---|---|---|---|
| 4,153,541 A | | 5/1979 | Rumpf et al. |
| 4,159,942 A | | 7/1979 | Greer et al. |
| 4,386,519 A | * | 6/1983 | Sinkey ................. 73/61.66 |
| 4,773,989 A | * | 9/1988 | Pfalzer et al. ............ 209/729 |
| 4,872,972 A | | 10/1989 | Wakabayashi et al. |
| 4,960,525 A | * | 10/1990 | Dalby et al. ............ 210/788 |
| 5,582,727 A | * | 12/1996 | Foster .................. 210/258 |
| 5,882,475 A | * | 3/1999 | Vikio et al. ............... 162/4 |
| 6,003,683 A | | 12/1999 | McCarthy |
| 6,238,579 B1 | | 5/2001 | Paxton et al. |
| 6,896,720 B1 | | 5/2005 | Arnold et al. |
| 7,111,738 B2 | * | 9/2006 | Allen, III ................ 209/172 |
| 7,473,216 B2 | * | 1/2009 | Lolachi et al. ............. 494/45 |
| 2006/0130444 A1 | | 6/2006 | Smith et al. |

FOREIGN PATENT DOCUMENTS

| | | | | |
|---|---|---|---|---|
| GB | 422 865 A | | 1/1935 | |
| GB | 886 208 A | | 1/1962 | |
| GB | 2024664 A | * | 1/1980 | ............. B04C 5/24 |
| JP | 54-29162 | | 3/1979 | |
| JP | 56-024962 | | 3/1981 | |
| JP | 04-349951 | | 12/1992 | |
| JP | 2002-503541 | | 2/2002 | |
| JP | 2005-279609 | | 10/2005 | |
| JP | 2006-043566 | | 2/2006 | |
| NL | 110772 C | | 3/1965 | |

OTHER PUBLICATIONS

European Search Report for EP 08 15 1741 dated Sep. 24, 2012.

* cited by examiner

VORTEX STRUCTURE FOR HIGH THROUGHPUT CONTINUOUS FLOW SEPARATION

CROSS REFERENCE TO RELATED PATENTS AND APPLICATIONS

This application is related to U.S. application Ser. No. 11/606,458, entitled "Serpentine Structures for Continuous Flow Particle Separations," filed Nov. 30, 2006 by Lean, et al. and U.S. application Ser. No. 11/606,460, entitled "Particle Separation and Concentration System", filed Nov. 30, 2006 by Lean et al. which are incorporated herein by reference in their entirety.

BACKGROUND

Three U.S. patents describe macro-scale vortex structures aimed primarily at slag recovery: U.S. Pat. No. 4,011,068 (Mar. 8, 1977), U.S. Pat. No. 4,140,632 (Feb. 20, 1979) and U.S. Pat. No. 4,146,468 (Mar. 27, 1979). All three patents are expired. However, those devices are not miniaturized and include an inner porous vertical wall. Also, these prior systems rely on gravity for sedimentation and can therefore only separate out particles with sedimentation times shorter than the residence time of the particles within the structures. This restricts minimum particles sizes to 70-150 um. Daniel Chiu has also published a brief communication: "High Radial Acceleration in MicroVortices," Nature, Vol. 425, September 2003 which describes driving a shear fluid to couple into one corner of a micron-scale pancake structure to create high accelerations.

Particle separation and concentration is an important requirement especially in biological and chemical processes for both macro-scale and miniaturized lab-on-chip applications. Some of the methods employed today are mechanical sieving and sedimentation which are usually reserved for separation of large particles. Techniques such as hydrodynamic chromatography, size exclusion chromatography and electrophoresis allow separation of smaller particles.

In addition, U.S. application Ser. No. 11/606,458, entitled "Serpentine Structures for Continuous Flow Particle Separations," filed Nov. 30, 2006 by Lean, et al. and U.S. application Ser. No. 11/606,460, entitled "Particle Separation and Concentration System", filed Nov. 30, 2006 by Lean et al. are incorporated herein by reference in their entirety and relate to particle flow separation systems.

These applications make advantageous use of the phenomenon of a radial or transverse pressure gradient to affect efficient separations. However, in a vortex structure, much higher transverse pressure gradients may be realized and used to separate sub-micron particles.

Large scale water purification and mining/mineral recovery applications require large volume, high throughput, and rapid processing capabilities. Current water purification methods require sand beds and even membrane filters depending on the desired water quality. Mineral processing systems use a spiral concentrator design where a helical trough allows heavy minerals to sediment near the center while centrifugal force pushes lighter particles outward where they are transported away. The tray has a sloped cross-section which is deeper near the axis of the helix.

Another important application is bio-defense, where the challenge is to determine and detect biological threats in the water supply. The United States Department of Defense (DoD) has set standards for expected limit of detection (LOD) for a list of potential agents. In particular, the Tri-Service Standard for anthrax spores is 100 cfus/L, which poses a significant challenge in logistics, time, and concentration factor. Neglecting all losses, at least 1000 L of water must be screened with a concentration factor of $10^6$ for a typical detector sensitivity of $10^5$ cfus/mL. The most popular method for screening large volumes of water is tangential flow filtration (TFF) with low molecular weight cut-off (MWCO) membranes (typically 30 KDa). Commercial providers of these pre-engineered systems include Pall Filtration, Millipore and US Filter. The biggest challenge to this method and to all these vendors is the low yield and laborious recovery of captured pathogens from these membranes.

INCORPORATION BY REFERENCE

U.S. application Ser. No. 11/606,458, entitled "Serpentine Structures for Continuous Flow Particle Separations," filed Nov. 30, 2006 by Lean, et al. and U.S. application Ser. No. 11/606,460, entitled "Particle Separation and Concentration System", filed Nov. 30, 2006 by Lean et al. are incorporated herein by reference in their entirety.

BRIEF DESCRIPTION

In one aspect of the presently described embodiments, a system comprises a first device having an inlet, a chamber, and an outlet, the first device being operative to receive the fluid at the inlet, capture particles of a first size range from the fluid by maintaining a vortex flow in the chamber and expel the fluid from the chamber through the outlet and a second device having an inlet connected to the outlet of the first device, a chamber, and an outlet, the second device being operative to receive the fluid at the inlet, capture particles of a second size range from the fluid by maintaining a vortex flow in the chamber and expel the fluid from the chamber through the outlet.

In another aspect of the presently described embodiments, the chamber of the first device includes at least one collection cavity.

In another aspect of the presently described embodiments, the at least one collection cavity is selectively placed in an open or closed state.

In another aspect of the presently described embodiments, the chamber of the second device includes at least one collection cavity.

In another aspect of the presently described embodiments, the at least one collection cavity of the second device is selectively placed in an open or closed state.

In another aspect of the presently described embodiments, the chamber of the first device is provided with a second outlet to a collection well.

In another aspect of the presently described embodiments, the chamber of the second device is provided with a second outlet to a collection well.

In another aspect of the presently described embodiments, the particles in the first size range are larger than the particles in the second size range.

In another aspect of the presently described embodiments, the first and second devices are tuned to operate as a function of at least one of flow velocity of the fluid, channel width of respective inlets, viscosity of the fluid, and radius of curvature of respective chambers.

In another aspect of the presently described embodiments, the system is configured to process particles on a micro-scale.

In another aspect of the presently described embodiments, the system is configured to process particles on a macro-scale.

In another aspect of the presently described embodiments, a system comprises a system inlet for receiving the fluid and a plurality of devices cascaded to selectively process particles of varying size, each device comprising an inlet to receive the fluid, a chamber to capture particles in a selected size range by maintaining a vortex flow of the fluid in the chamber, and an outlet to expel the fluid from the chamber.

In another aspect of the presently described embodiments, the system further comprises a system outlet.

In another aspect of the presently described embodiments, the system outlet is operative as an outlet for the last device in the system.

In another aspect of the presently described embodiments, the system inlet and system outlet are connected.

In another aspect of the presently described embodiments, the cascaded plurality of devices sequentially process particles as a function of particle size in a descending manner.

In another aspect of the presently described embodiments, the devices are tuned to operate as a function of at least one of flow velocity of the fluid, channel width of respective inlets, viscosity of the fluid, and radius of curvature of respective chambers.

In another aspect of the presently described embodiments, the system is configured to process particles on a micro-scale.

In another aspect of the presently described embodiments, the system is configured to process particles on a macro-scale.

In another aspect of the presently described embodiments, the system is cascaded and operated in a closed loop or by using multiple passes to increase efficiency and selectivity.

BRIEF DESCRIPTION OF THE DRAWINGS

FIGS. 3(a) and (b) illustrate a feature of one of the presently described embodiments;

DETAILED DESCRIPTION

The presently described embodiments are directed to a class of devices that address separation and concentration of particles, including biological agents, suspended in a fluidic medium. The methods employed currently for this purpose such as centrifugation, sedimentation, filtration, etc., typically utilize batch processes, as opposed to continuous processes. These processes usually require comparatively large investments in supporting equipment. The presently described embodiments use a continuous process employing simple vortex geometry, and appurtenant fluidic velocity, to achieve separation and/or concentration of particles over a large dynamic size range. This continuous and elegant concentration process does not require a membrane, is highly scalable, and may be designed for high throughput, high resolution screening of particles in a fluid.

Macro-scale applications of the presently described embodiments include water purification and mineral processing. The contemplated vortex geometry is also particularly well-suited for micro-scale applications such as miniaturized lab-on-chip complete analysis or protein purification for proteomics. For example, compared to traditional gel electrophoresis systems, this device will allow several orders of magnitude increase in speed for separation of native proteins in buffer.

The presently described embodiments allow separation and concentration of particles based on centrifugal force on suspended particles, including biological matter, which are made to flow in a vortex structure. This centrifugal force urges larger particles to collect along outer portions of the vortex flow. Conversely, within a vortex structure, a radial hydrodynamic pressure drop is also amplified to urge smaller particles toward inner portions of the vortex flow. This force created by the pressure can reach magnitudes that encourage a sharp cut-off and improved resolution discrimination between particle sizes. Thus, separated streams of particles can be collected with both increased concentration and purification.

The presently described embodiments solve the issues raised by high volume, high throughput, rapid screening of water, and other large scale processing of minerals. Particles can be separated from the fluid by a geometric effect of the channel as a function of flow rate. Another advantage of the presently described embodiments is that continuous particle separation of a wide range of liquid volumes can be achieved. This is an improvement over known techniques, such as centrifugation or chromatography, where real time particle collection is not typically possible.

The phenomenon of the presently described embodiments is based on interplay of several forces acting on the particles in a curved section of a device or channel leading to a controllable resultant movement of the particles in the transverse direction. This phenomenon does not depend on any external field for particle manipulation. As such, a continuous particle sorting functionality is possible depending on the device geometry. The compactness and elimination of an external field makes it a very good candidate for lab-on-chip type applications.

Figure 1:
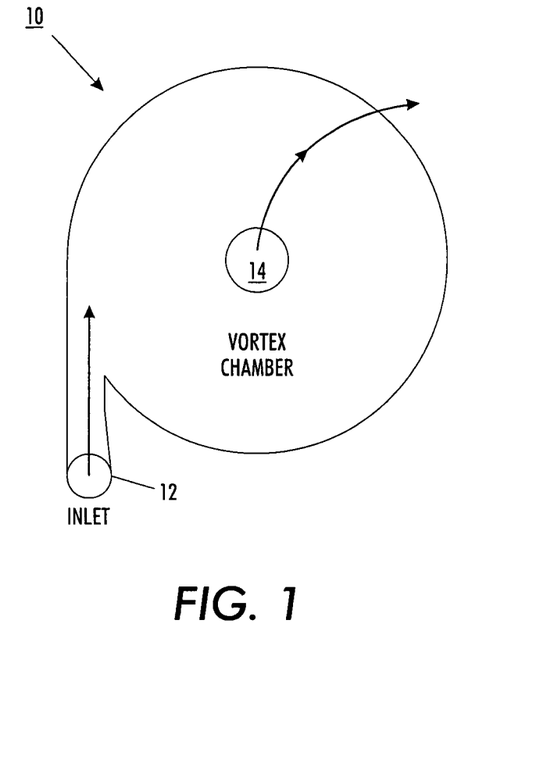
FIG. 1 is a graphic illustration relating to the principles of the presently described embodiments.

To illustrate, with reference now to FIG. 1, a graphic illustration of a vortex chamber 10 is illustrated. Of course, it will be appreciated that the chamber 10 will, in at least one form, be defined by a device such as those described hereafter that is capable of maintaining a vortex flow of fluid (typically at about 0.1 m/s and higher) therein. The vortex chamber 10 includes an inlet 12, as well as an outlet 14. In the example shown, the inlet is 0.5 mm wide, while the outlet is 0.2 mm in radius. The center round chamber has a 1 mm radius. Of course, these are merely examples. As shown, fluid enters the inlet, swirls in the chamber (if the fluid velocity is sufficient) in a clock-wise direction following the curve of the chamber (thus creating a vortex flow), and exits through the outlet 14.

A great benefit of the presently described embodiments is the scalability thereof. So, the principles of the presently described embodiments can be applied on a microscale (e.g., sub-micron sized particles) or on a macroscale. The principle of particle separation, according to the presently described embodiments, is based on the forces that occur, and oppose one another, in a vortex flow of fluid at a sufficient velocity. That is, at certain minimum velocities, centrifugal forces, as well as pressure-driven forces, are generated in the vortex flow and act on particles that flow in a vortex pattern. In this regard, the vortex chamber 10 can be tuned to separate larger particles or smaller particles as a function of the centrifugal forces—which push larger particles to the outside of the vortex—and the pressure-driven forces—which push smaller particles toward the outlet 14 in the center of the vortex. With respect to tuning the device, it should be appreciated that this could be accomplished using a variety of different techniques. For example, the devices may be tuned to operate as a function of flow velocity of the fluid, channel width of respective inlets, viscosity of the fluid, or the radius of curvature of respective chambers. So, these factors and others can be adjusted to tune the devices to separate different sized particles. For example, inlet dimensions and chamber radius may be used to adjust the fluid velocity. The fluid velocity can also be adjusted by way of a pump in the system. Different fluids with different viscosity may also flow at different velocities.

It should also be understood that the noted forces may be represented as follows, under the given example conditions:

Example Conditions
radius of the chamber (R)=0.0005 m
fluid velocity (v)=0.2 m/s
fluid density (ρ)=1050 kg/m$^3$
chamber pressure (P)=70 Pa
Centrifugal Force
$F_c=Mv^2/R=4/3\pi r^3 pv^2/R=107\pi r^3 p(m/s^2)=10^5 \pi r^3 (kg/m^2s^2)$
Pressure-Driven Force
$F_P=P\pi r^2=70\pi r^2 Pa=70\pi r^2 (kg/ms^2)$
So, if the radius of the particle (r)=1.5×10$^{-6}$ m,
$F_c=3.4\pi r \times 10^{-13} (kgm/s^2)$ and
$F_P=1.6 \pi x \times 10^{-10} (kgm/s^2)$ This illustrates, in at least this example, a difference between the centrifugal force $F_c$ and pressure-driven force $F_P$ of three orders of magnitude. Thus, although the values may vary depending on the conditions experienced and implemented, these forces can be advantageously used to separate or concentrate particles.

Other observations with respect to the vortex characteristics include, but are not limited to, the following. First, it is advantageous to achieve a minimum fluid velocity to maintain the vortex flow in the system. In one form, this fluid velocity is 0.1 m/s for a chamber of this dimension.

Second, the pressure drop between the outer portions and inner portions of the vortex chamber is greater for greater radial dimensions of the chamber. For example, for a chamber size of 2 mm, the pressure drop is approximately 72 Pa. For a chamber size of 5 mm, the pressure drop is approximately 108 Pa. For a chamber size of 10 mm, the pressure drop is approximately 275 Pa. However, the pressure gradient should be maintained across the radius of the cavity to affect separation. In this regard, the lack of a sufficient pressure gradient is a reason that certain prior vortex-type devices would not be suitable for the presently described embodiments.

Third, the radial velocity of particles within the chamber is greater for greater radial dimensions of the chamber. For example, for a chamber size of 2 mm, the peak radial velocity is approximately 0.31 m/s. For a chamber size of 5 mm, the peak radial velocity is approximately 0.38 m/s. For a chamber size of 10 mm, the peak radial velocity is approximately 0.61 m/s.

It should be understood that the presently described embodiments may be implemented in a variety of manners, configurations and environments. As but one example, a micro-scale version of such a device can be fabricated from a variety of materials such as polycarbonate or Plexiglas-type using a variety of techniques including micromachining techniques. In one form, the materials used are not readily deformable to accommodate high pressure in the system. The device can be conveniently integrated inline with other components in a lab-on-chip type environment. Particles of varying size ranges, including sub-micron (less than 1 micron) sized particles may be separated/concentrated.

Figure 2A:
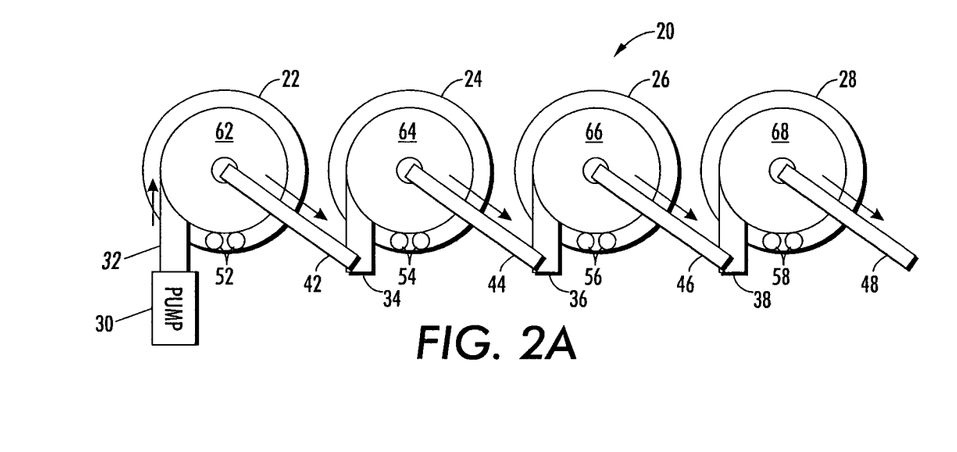
FIGS. 2(a) and (b) illustrate one of the presently described embodiments.

With reference now to FIG. 2(a), a plurality of vortex devices may be cascaded to sequentially separate particles of varying size—progressively through the system. Of course, it should be appreciated that such a system may also be adapted to operate in parallel fashion to accommodate a higher volume of fluid, for example. Also, in some applications, only a single device may be used.

Figure 2B:
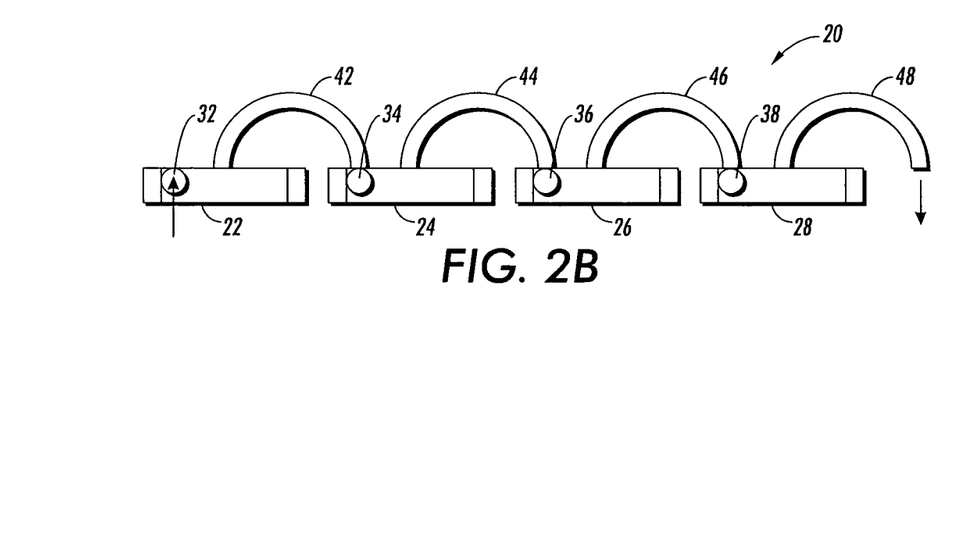

As shown, a system 20 includes a first vortex device 22, a second vortex device 24, a third vortex device 26, and a fourth vortex device 28. Each device comprises a chamber (62, 64, 66, and 68, respectively) wherein a vortex flow of fluid is maintained. Each of these chambers has an inlet (32, 34, 36, and 38, respectively) and an outlet (42, 44, 46, and 48, respectively). The inlet to the first device (e.g. device 22) according to the presently described embodiments may also be considered a system inlet while the outlet of the last device (e.g. device 28) may also be considered a system outlet. Also shown are collection cavities (52, 54, 56, and 58, respectively) which collect the particles that flow on the outer portions of the vortex after separation. Of course, the particles that do not travel to the outer portions of the vortex for collection/separation are urged through the outlet to the succeeding or next vortex chamber for further separation. It is to be appreciated that each chamber can be tuned, as noted above, to progressively separate particles. Also shown is a pump 30 that may be positioned in a variety of locations but, in this form, is provided at the inlet. It is to be understood that the pump 30 initiates the fluid flow in the system and maintains a fluid flow of sufficient velocity so as to maintain the vortex flow in the devices and separate particles. Any suitable pump will suffice. For example, depending on the implementation, recirculation, single pass/stage, or multi-stage pumps may be used. Also, multiple pumps may be used. It should also be understood that the pump in all embodiments herein may be connected to a suitable fluid supply (not shown) for the system or fluid may be supplied to the system by other suitable techniques. With the use of a pump, gravity is not needed to generate the vortex phenomenon. FIG. 2(b) shows a side view of the system 20 (without pump 30).

Figure 3:
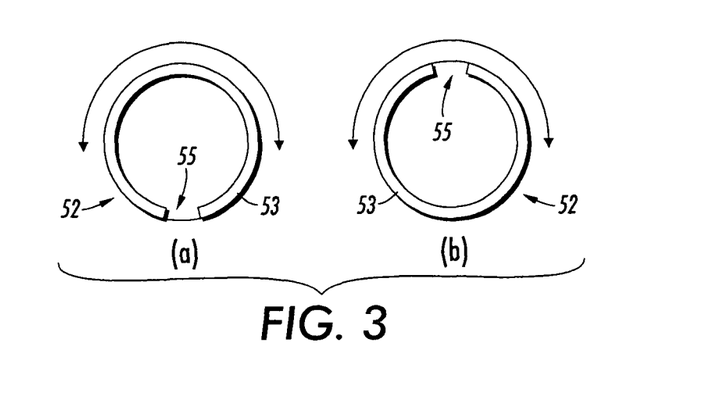

With respect to the collection cavities, with references to FIGS. 3(a) and 3(b), it can be seen that the collection cavities (such as collection cavity 52 shown as an example) include a sleeve (such as sleeve 53) having a slit or opening (such as opening 55) therein which rotates—to open and close the collection cavity. This allows for flexibility in design and operation of implementations of the vortex chamber systems described herein. Separated particles may be collected from the cavities using micro-pipetting techniques.

Figure 4:
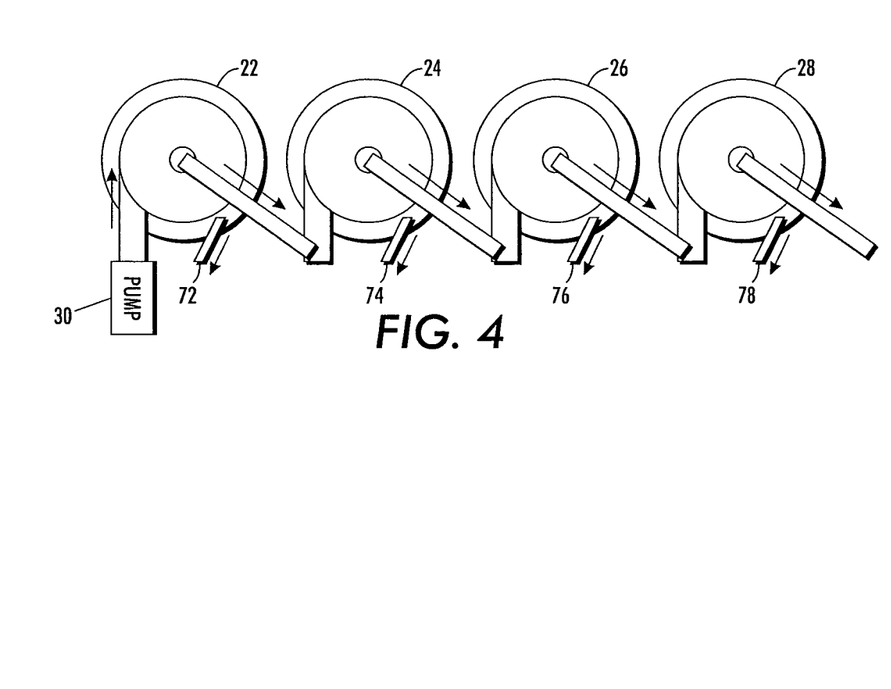
FIG. 4 illustrates another of the presently described embodiments.

With reference now to FIG. 4, a further embodiment is described. This embodiment is similar to that of FIGS. 2(a) and 2(b); however, collection cavities are not resident within or on the vortex chamber. In this regard, the devices are simply provided with collection well outlets (72, 74, 76, and 78, respectively) that connect to collection well(s) (not shown). The collection well(s) may be a common collection well for the entire system, or separate collection wells for each of the vortex chambers. Of course, any suitable collection well could be used. A pump 30 is also shown.

Figure 5:
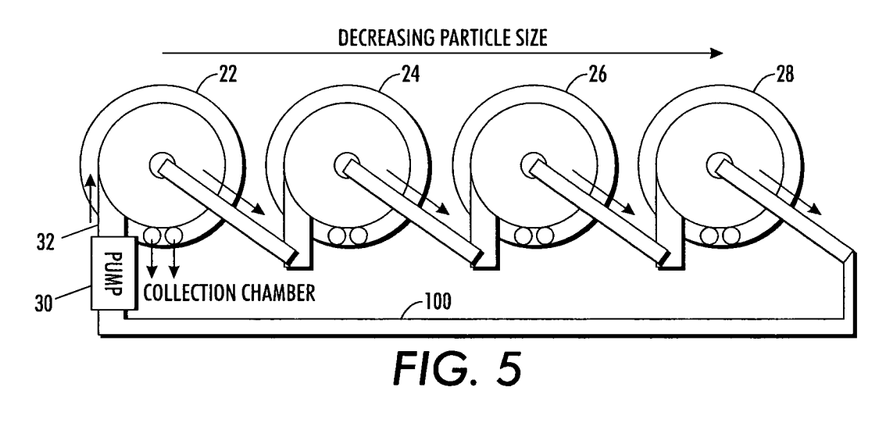
FIG. 5 illustrates another of the presently described embodiments.

With reference now to FIG. 5, a still further embodiment is illustrated. In this embodiment, four devices 22, 24, 26, and 28 having collection chambers are cascaded and a feedback line 100 is provided from the outlet 48 of the last vortex device 28 to the inlet 32 of the first vortex device 22. A pump 30 is also shown. Of course, this provides for a closed-loop system which may be used to continuously separate particles of a given volume. The pump may be incorporated anywhere in the closed system and operated in a variety of known manners. Multiple passes allow for increased separation efficiency and selectivity. It will be appreciated that the systems illustrated in FIGS. 2(a), 2(b) and 4 represent open loop systems.

Figure 6:
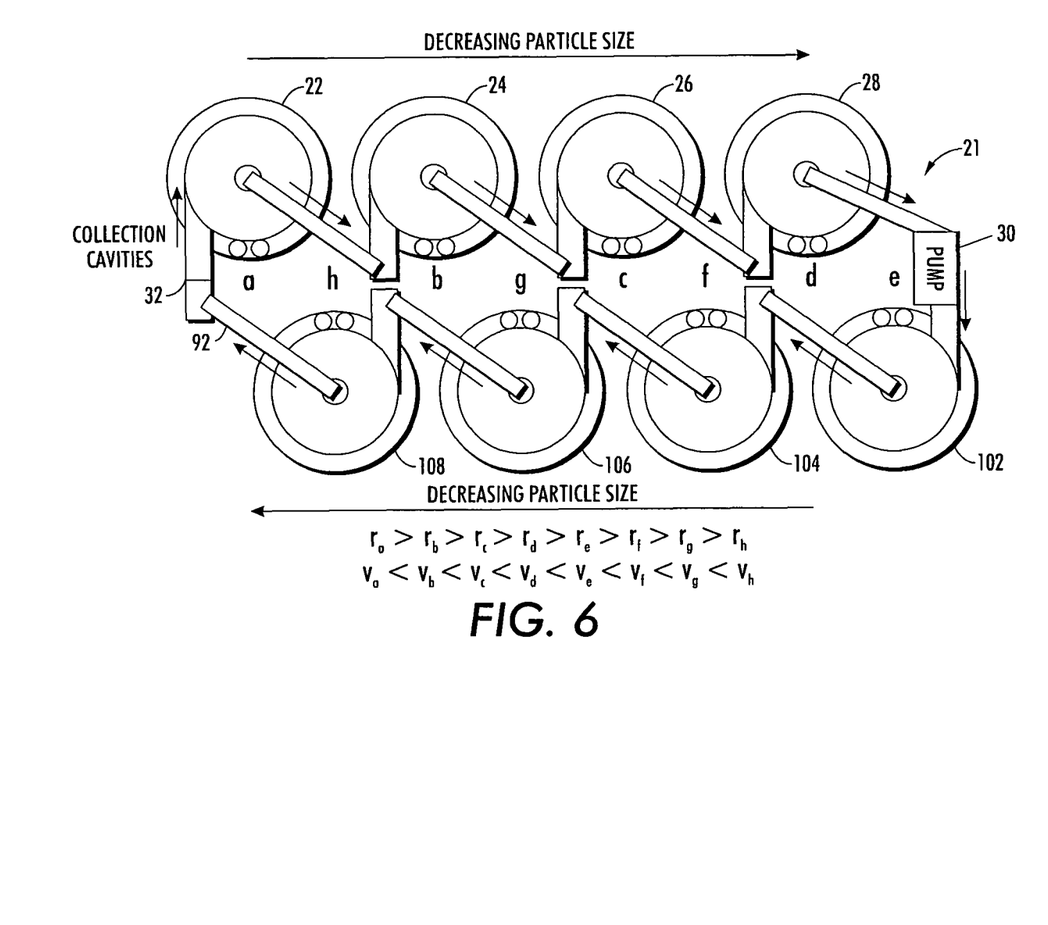
FIG. 6 illustrates another of the presently described embodiments.

Similarly, with references now to FIG. 6, another closed-loop-type system 21 is illustrated. In this system, the feedback line 100 is replaced with four additional devices 102, 104, 106, and 108 to form a 2D array. Notably, the outlet 92 of the device 108 is connected to the inlet 32 of the device 22. Again, a pump 30 may be incorporated anywhere in the closed system and operated in a variety of advantageous manners. In one form, particles of decreasing size are outlet from one chamber to the next successive device. So, the radius of the particles collected within the first device 22 is greater the particles collected or separated by each of the other devices that are cascaded together. Conversely, it should be understood that velocity of the particles in each chamber increases as the size of the particles separated decreases. This embodiment represents a large 2D array that may be configured for high resolution separation whereby each chamber acts to divide a mixture based on size and mass in a monotonic manner.

Figure 7:
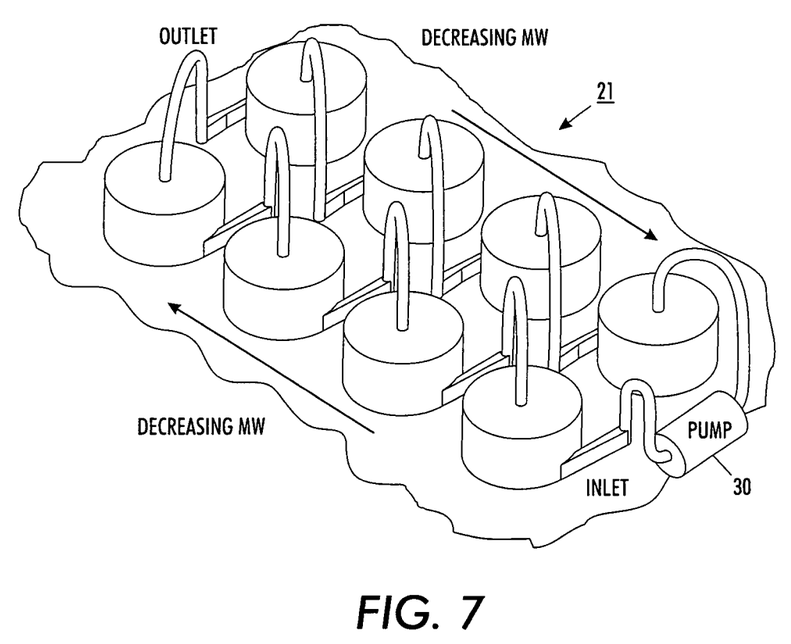
FIG. 7 illustrates a perspective view of the embodiment shown in FIG. 6.

FIG. 7 illustrates a perspective view of the system 21 of FIG. 6. As illustrated, the system 21 is configured so that the particles of decreasing molecular weight are separated by each successive device.

A variety of embodiments have been described herein. In connection with operation of these embodiments, in at least one form, it is clear that fluid flow is initiated in the system via the pump. The fluid velocity is maintained at a sufficient level to generate and maintain a vortex flow in each of the cascaded devices (if they are indeed cascaded) (or in a single device if a single device is used). As a result of the vortex phenomenon, particles are then separated in each of the devices, according to the characteristics tuned into the process and the devices. As noted, particles of different size ranges are separated in different devices. So, fluid flows from one device to the next. At each device, or stage, particles of different size ranges are removed from the fluid and the remaining fluid is passed on to the next device or stage. The system can be tuned to remove progressively smaller particles at each stage. In addition, in a closed system, the fluid may be recirculated.

Implementation of the presently described embodiments will result in a system having at least the following advantageous benefits:

continuous flow, high throughput separation and concentration with selectable particle size (sub-μm and up) cut-off and sample volumes (micro milliliter and up) without use of any other external applied field;

use of only flow velocity, channel width, viscosity, and radius of curvature to tune operation for any desired range of particle sizes;

realization of a system where no membrane is needed, thus, circumventing traditional membrane methods that require back-flush together with laborious and low-yield recovery;

possible modular plastic design to allow for variable flow cross-sections, is inexpensive, and amenable for disposable use;

applicability to all particles in a given size range, for removal and collection in cavities or streamed through capture outlets;

inherent scalability from macro-scale to micro-scale (LOC) operation;

ability to integrate with routing and sensing capabilities on the same chip;

ability to integrate inline as a front-end to a Tangential Flow Filtration (TFF) system to augment TFF performance; and, ability to be cascaded sequentially for higher discrimination or in parallel for higher throughput.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for separating or concentrating particles suspended in a fluid, the system comprising:

a first device having an inlet, a chamber, and an outlet of the first device, the first device being configured to receive the fluid at the inlet, capture particles of a first size range urged by centrifugal forces to an outer portion of a vortex flow of the fluid in the chamber and expel the fluid and remaining particles urged by hydrodynamic pressure forces from the chamber through the outlet of the first device, wherein the chamber of the first device includes at least one collection cavity positioned to capture the particles of the first size range in the outer portion of the vortex flow and selectively placed in an open or closed state;

a second device having an inlet connected to the outlet of the first device in a cascaded configuration to sequentially separate particles, a chamber, and an outlet of the second device, the second device being configured to receive the fluid at the inlet, capture particles of a second size range urged by centrifugal forces to an outer portion of a vortex flow of the fluid in the chamber and expel the fluid and remaining particles urged by hydrodynamic pressure forces from the chamber through the outlet of the second device; and, a pump operated to maintain fluid velocity of a continuous flow of the fluid at a level sufficient to generate and maintain the vortex flow in each of at least the first device and the second device.

2. The system as set forth in claim 1 wherein the chamber of the second device includes at least one collection cavity positioned to capture the particles of a second size range in the outer portion of the vortex flow.

3. The system as set forth in claim 2 wherein the at least one collection cavity is selectively placed in an open or closed state.

4. The system as set forth in claim 1 wherein the chamber of the first device is provided with a second outlet to a collection well, the second outlet of the first device being positioned to capture the particles of the first size range in the outer portion of the vortex flow.

5. The system as set forth in claim 1 wherein the chamber of the second device is provided with a second outlet to a collection well, the second outlet of the second device being positioned to capture the particles of the second size range in the outer portion of the vortex flow.

6. The system as set forth in claim 1 wherein the particles in the first size range are larger than the particles in the second size range.

7. The system as set forth in claim 1 wherein the first and second devices are tuned to operate as a function of only at least one of flow velocity of the fluid, channel width of respective inlets, viscosity of the fluid, and radius of curvature of respective chambers.

8. The system as set forth in claim 1 wherein the system is configured on a micro-scale to process particles.

9. The system as set forth in claim 1 wherein the system is configured on a macro-scale to process particles.

10. The system as set forth in claim 1 wherein the fluid is a liquid.

11. A system for separating or concentrating particles suspended in a fluid, the system comprising:
a system inlet for receiving the fluid;
a plurality of devices cascaded to sequentially separate particles of varying size, each device comprising an inlet to receive the fluid, a chamber to capture particles in a selected size range urged by centrifugal forces to an outer portion of a vortex flow of the fluid in the chamber, the chamber including at least one collection cavity positioned to capture the particles of the selected size range in the outer portion of the vortex flow and selectively placed in an open or closed state, and an outlet to expel the fluid and remaining particles urged by hydrodynamic pressure forces from the chamber; and,
a pump operated to maintain fluid velocity of a continuous flow of the fluid at a level sufficient to generate and maintain the vortex flow in each of the plurality of devices.

12. The system as set forth in claim 11 further comprising a system outlet.

13. The system as set forth in claim 12 wherein the system outlet is operative as an outlet for the last device in the system.

14. The system as set forth in claim 12 wherein the system inlet and system outlet are connected.

15. The system as set forth in claim 11 wherein the cascaded plurality of devices sequentially process particles as a function of particle size in a descending manner.

16. The system as set forth in claim 11 wherein the devices are tuned to operate as a function of only at least one of flow velocity of the fluid, channel width of respective inlets, viscosity of the fluid, and radius of curvature of respective chambers.

17. The system as set forth in claim 11 wherein the system is configured on a micro-scale to process particles.

18. The system as set forth in claim 11 wherein the system is configured on a macro-scale to process particles.

19. The system as set forth in claim 11 wherein the system may be cascaded and operated in closed loop or by using multiple passes to increase separation efficiency and selectivity.

20. The system as set forth in claim 11 wherein the fluid is a liquid.

* * * * *